US012468960B1

(12) United States Patent
Prabhakara et al.

(10) Patent No.: US 12,468,960 B1
(45) Date of Patent: Nov. 11, 2025

(54) PREDICTION MODEL TRAINING USING DETECTED ANOMALIES

(71) Applicant: Workday, Inc., Pleasanton, CA (US)

(72) Inventors: Kiran Prabhakara, Fremont, CA (US); Arun Krishnaswamy, San Ramon, CA (US); Venu Kasyap Tangirala, Mountain View, CA (US); Changsheng Chen, Orinda, CA (US); Roy Sturgeon, El Granada, CA (US); Ganesh Rajaratnam, Fremont, CA (US)

(73) Assignee: Workday, Inc., Pleasanton, CA (US)

(*) Notice: Subject to any disclaimer, the term of this patent is extended or adjusted under 35 U.S.C. 154(b) by 1264 days.

(21) Appl. No.: 16/601,309

(22) Filed: Oct. 14, 2019

(51) Int. Cl.
G06N 20/00 (2019.01)
G06N 5/01 (2023.01)
G06N 5/022 (2023.01)
G06N 5/04 (2023.01)

(52) U.S. Cl.
CPC ............... G06N 5/04 (2013.01); G06N 5/01 (2023.01); G06N 5/022 (2013.01); G06N 20/00 (2019.01)

(58) Field of Classification Search
CPC ........................................................ G06N 3/00
See application file for complete search history.

(56) References Cited

U.S. PATENT DOCUMENTS 7,552,365 B1 * 6/2009 Marsh ................ G06F 11/0751
707/999.005
2018/0218303 A1 * 8/2018 Cole ...................... G06N 20/00
2020/0134642 A1 * 4/2020 Morgan ............ G06Q 10/06315
2020/0167653 A1 * 5/2020 Manjunath ............. G06N 3/082
2020/0401472 A1 * 12/2020 Tamizhmani ....... G06F 11/0793
2021/0110413 A1 * 4/2021 Ouellet ............. G06Q 30/0202

FOREIGN PATENT DOCUMENTS

WO WO-2021008913 A1 * 1/2021 ........... G06K 9/6257

OTHER PUBLICATIONS

Dim Papadopoulos, We don't need No. bounding boxes, Arp. 24, 2017, arXiv, pp. 1-10 (Year: 2017).*
Adrian Rosebrock, How to tune hyperparameters wwith Python and scikt-learn, Aug. 15, 2016, PylmageSearch, 1-12 (Year: 2016).*
Quan Hua, Machine Learning with TensorFlow 1.x, Nov. 21, 2017, Pact Publishing, 201-210 (Year: 2017).*
Klinkmuller, C. et al., "Listen to me: improving process model matching through user feedback," Business Process Management: Proc. of the 12th Intl. Conf (2014) 16 pp. (Year: 2014).*
Brownlee, J., "4 Common Machine Learning Data Transforms for Time Series Forecasting," <machinelearningmastery.com/machine-learning-data-transforms-for-time-series-forecasting> (Aug. 28, 2019) 40 pp. (Year: 2019).*

* cited by examiner

*Primary Examiner* — Brian M Smith
(74) *Attorney, Agent, or Firm* — Van Pelt, Yi & James LLP (57) ABSTRACT

A system for a prediction model includes an interface and a processor. The interface is configured to receive historical data. The processor is configured to determine hyperparameters based at least in part on a best model of N models; determine the prediction model by training using the hyperparameters on the historical data; determine detected anomalies based at least in part on an output of the prediction model; receive user feedback on the detected anomalies and undetected anomalies; and retrain the prediction model using the hyperparameters and based on the user feedback.

13 Claims, 7 Drawing Sheets

PREDICTION MODEL TRAINING USING DETECTED ANOMALIES

BACKGROUND OF THE INVENTION

Prediction models are difficult to develop. It is difficult to determine whether important factors have been accounted for and often the prediction from a model does not match a forecast that has been developed by other sources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a prediction model is disclosed. The system includes an interface and a processor. The interface is configured to receive historical data. The processor is configured to determine hyperparameters based at least in part on a best model of N models; determine a prediction model by training using the hyperparameters on the historical data; determine detected anomalies based at least in part on an output of the prediction model; receive user feedback on the detected anomalies and undetected anomalies; and retrain the prediction model using the hyperparameters and based on the user feedback.

The system for a prediction model uses anomaly detection to aid in training of the model. A prediction model is determined using historical data and by training a plurality of models based on a first portion of the historical data. The plurality of models is tested using a second portion of the historical data that is a recent portion of data, to determine a set of hyperparameters. In various embodiments, a hyperparameter in the set of hyperparameters comprises a number of epochs, an adaptive learning rate, a deep learning layer, a number of neurons in a layer, or any other appropriate hyperparameter. In some embodiments, each model of the plurality of models comprises a sequence to sequence-based neural network model with N layers of M neurons in each layer. For training, each model of the plurality of models is presented with training data and model weights are adjusted to match the desired output. Each model of the plurality of models is trained through the entire training set a number of times or epochs. Weights of the model are adjusted by an amount based on a step size or an adaptive learning rate. The best model is determined by checking the plurality of models using the second portion of the historical data (e.g., comparing a metric at the end of training). The hyperparameters used to generate the best model are selected as the set of hyperparameters. The selected set of hyperparameters is used to generate a prediction model using the entire historical set of data and then, using the prediction model, to determine predicted data. The predicted data is then compared to a forecast to determine detected anomalies. A user then provides feedback as to the validity of the detected anomalies as well as any undetected anomalies (e.g., anomalies that are not detected by the prediction model, but are detected by the user). The system, using the detected anomalies and the undetected anomalies, retrains the model with the selected set of hyperparameters to generate an updated prediction model.

The system for a prediction model improves the computer system by enabling the generation of a prediction model that is aligned with a forecast and takes into account user feedback. The ability to train the predication model using detected anomalies and undetected anomalies allows tailoring the prediction model to provide a better model for predicting behavior of an output parameter.

In some embodiments, the prediction model is used to predict the value of sales, revenue, or balance or any other appropriate value. In various embodiments, a forecast comprises a prediction developed by a human or a computer model predicting the value of sales, revenue, or balance.

Figure 1:
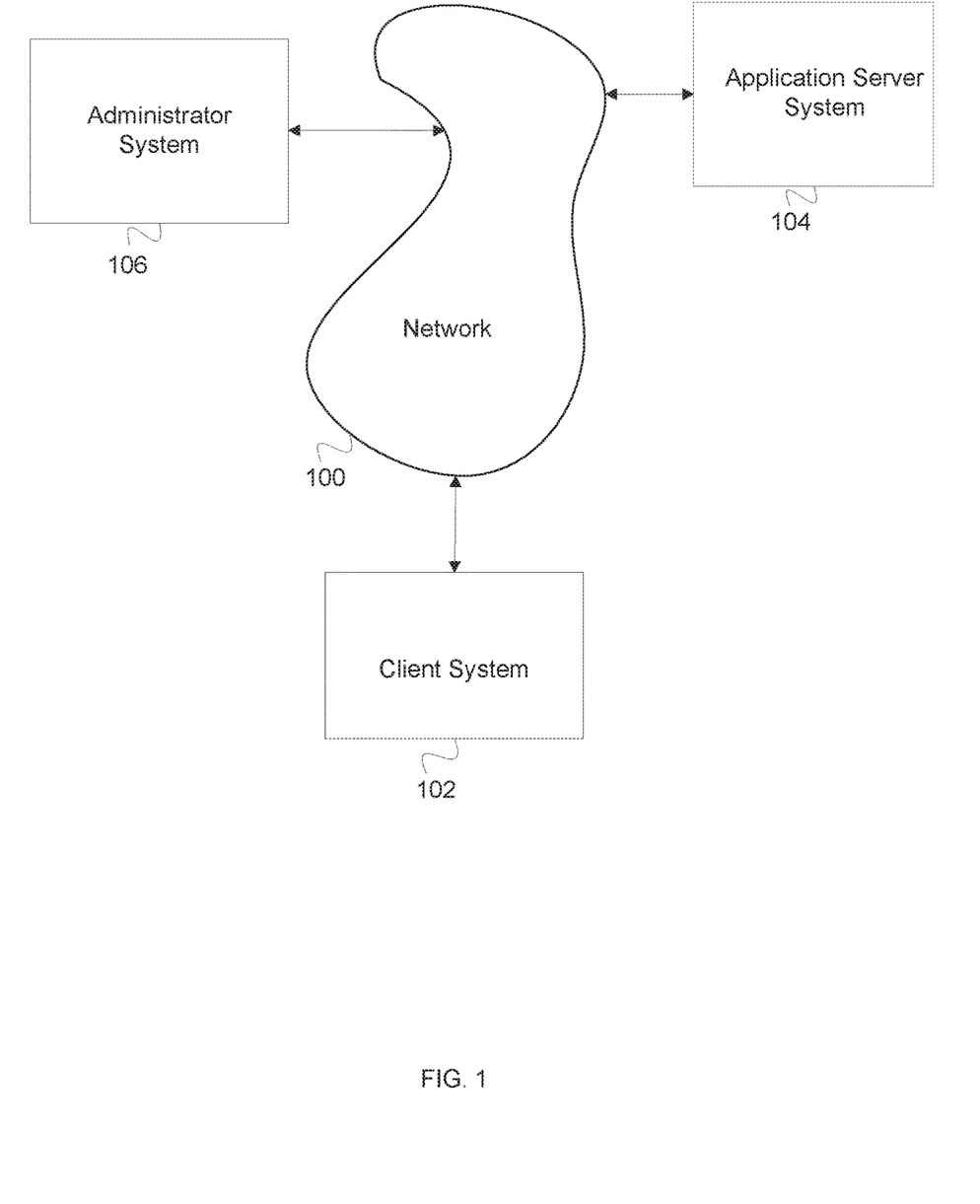
FIG. 1 is a block diagram illustrating an embodiment of a system for prediction modeling.

FIG. 1 is a block diagram illustrating an embodiment of a system for prediction modeling. In the example shown, a user using client system 102 interacts with application server system 104 via network 100. In various embodiments, network 100 comprises one or more of the following: a local area network, a wide area network, a wired network, a wireless network, the Internet, an intranet, a storage area network, or any other appropriate communication network. The user indicates to develop a prediction model using historical data. The application server system executes the training of a plurality of models and determines a prediction model using a set of hyperparameters determined by finding a best model of the plurality of models that can be determined using the historical data training and testing data sets. The predication model output and a received forecast are used to identify anomalies and these are provided from application server system 104 to a user using client system 102 for feedback. The user can indicate via client system 102 whether the indicated anomalies are valid or whether there are any undetected anomalies. Administrator system 106 is used by an administrator to administrate application server system 104.

Figure 2:
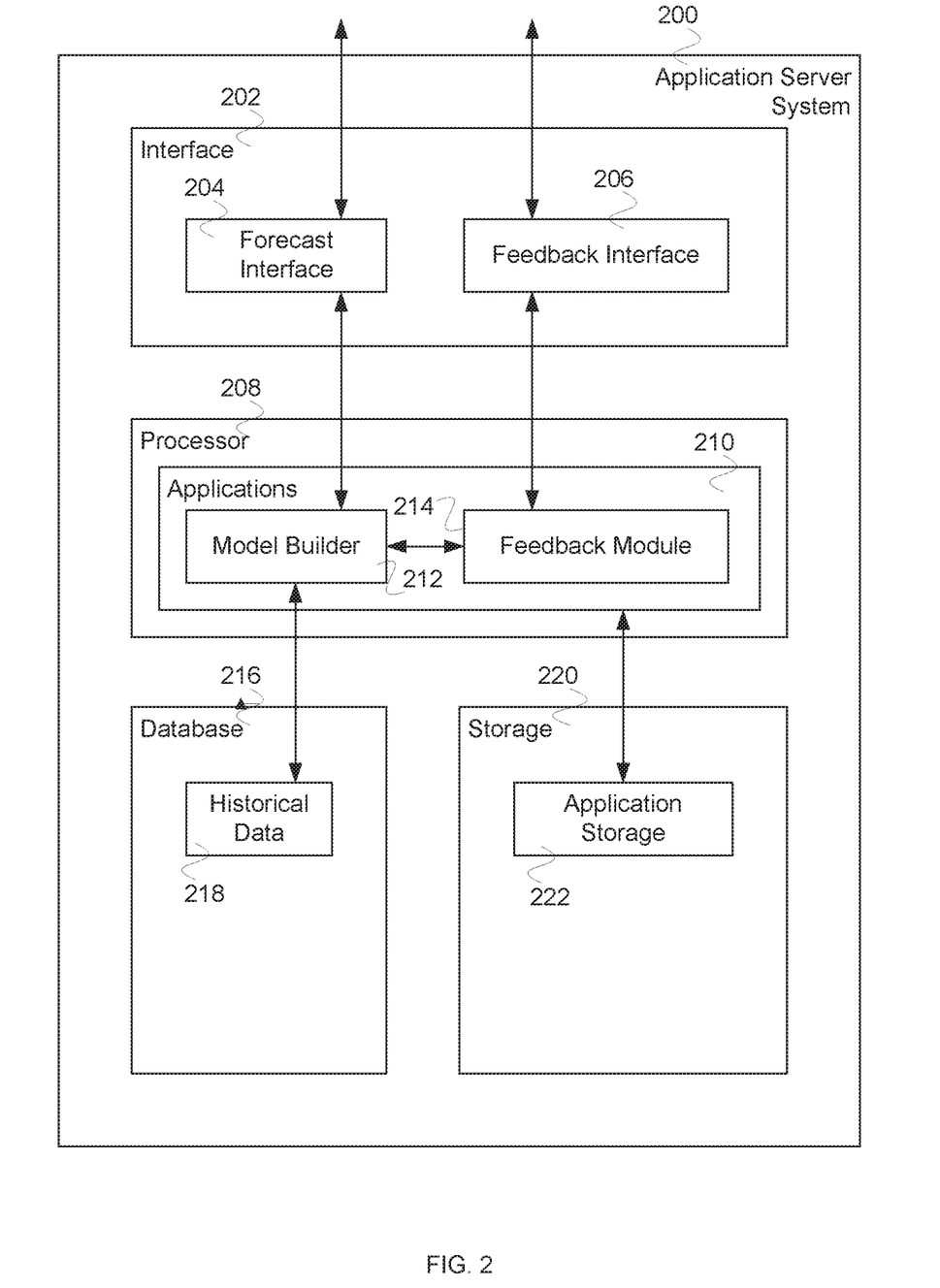
FIG. 2 is a block diagram illustrating an embodiment of an application server system.

FIG. 2 is a block diagram illustrating an embodiment of an application server system. In some embodiments, application server system 200 of FIG. 2 is used to implement application server system 104 of FIG. 1. In the example shown, application server system 200 includes interface 202, processor 208, database 216, and storage 220. Application server system 200 uses historical data 218 in database 216 to develop a model using model builder 212. Model builder 212 is executed as an application of applications 210 using processor 208. Model builder 212 determines a training data set and a test data set from historical data 218 to develop a plurality of models each with a different set of hyperparameters. In various embodiments, a hyperparameter comprises a number of epochs, an adaptive learning rate, a deep learning layer, a number of neurons in a layer, or any other appropriate hyperparameter. In some embodiments, a number of epochs comprises a number of times that the learning algorithm will work through the entire training data set (e.g., 50, 60, 80, 100, 200, etc.). In some embodiments, the adaptive learning rate comprises the amount that the weights are updated during training (e.g., a step size). In some embodiments, a deep learning layer comprises a layer that is the highest level building block in a deep learning model. In some embodiments, a deep learning layer comprises a container that usually receives weighted input, transforms it with a set of mostly non-linear functions, and then passes these values as output to the next layer. In some embodiments, a number of neurons in a layer comprises a number of neurons in a neural network model.

Model builder 212 determines a best set of hyperparameters by determining a best model trained and tested using the training data set and the test data set of the historical data. The best set of hyperparameters is used to train a prediction model with the full historical data set. The output of the prediction model is compared to a forecast that is input via forecast interface 204 of interface 202. The comparison is used to identify anomalies and these are provided to the user via feedback module 214 of applications 210 and feedback interface 206 of interface 202. User feedback indicating valid detected anomalies and anomalies not detected is used to retrain the prediction model using model builder 212. Applications 210 stores data in and reads data from application storage 222 of storage 220.

Figure 3:
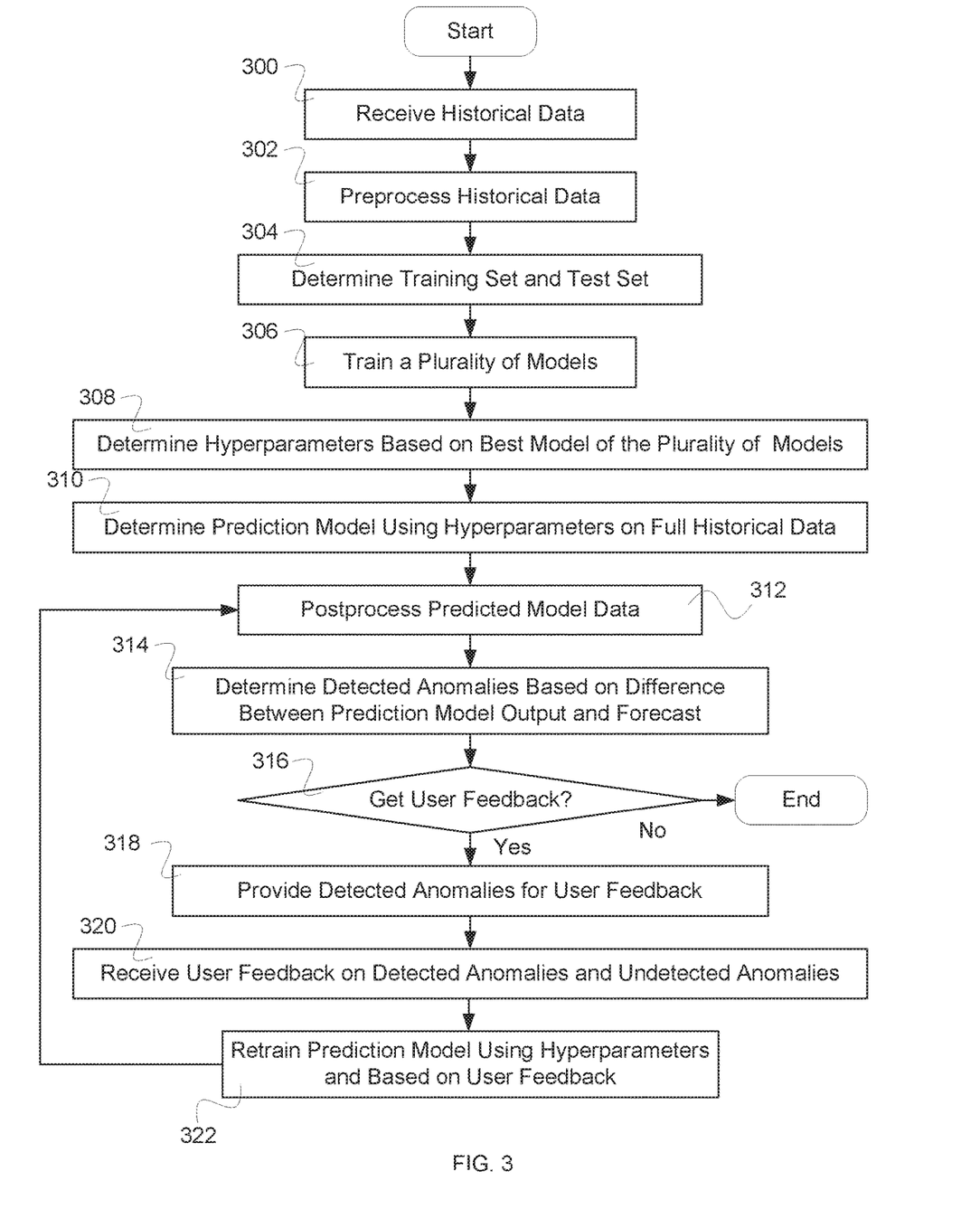
FIG. 3 is a flow diagram illustrating an embodiment of a process for a prediction model.

FIG. 3 is a flow diagram illustrating an embodiment of a process for a prediction model. In some embodiments, the process of FIG. 3 is executed using model builder 212 of FIG. 2 and feedback module 214 of FIG. 2. In the example shown, in 300, historical data is received. For example, stored historical data is received from a database. In 302, historical data is preprocessed. For example, the historical data is preprocessed by normalizing and/or differencing. In 304, a training set and a test set of data is determined. For example, a first portion of historical data is determined as a training set of data, and a second portion of historical data is determined as a test set of data. In 306, a plurality of models is trained. For example, N models are trained using a number of different sets of hyperparameters using the training set of data. In 308, hyperparameters are determined based on a best model of the plurality of models. For example, each model, after being trained, is tested using the test set of data and a score is determined based on how well a given model is able to predict the data in the test set of data. Hyperparameters are determined by checking the test results of training the N models, determining the best test result, and selecting the hyperparameters associated with the best test result are performed. In various embodiments, a hyperparameter comprises a number of epochs, an adaptive learning rate, a deep learning layer, a number of neurons in a layer, or any other appropriate hyperparameter. In 310, a prediction model is determined using hyperparameters on full historical data. For example, the hyperparameters associated with the best test result are used to train a prediction model with the full historical data set, and the prediction model is executed on a rolling window of the data to generate output predictions. In 312, the predicted model data is postprocessed. For example, the output of the prediction model is postprocessed (e.g., the data output is de-normalized and inverse differenced). In 314, detected anomalies are determined based on a difference between the prediction model output and a forecast. For example, the output of the prediction model and the forecast are used to identify anomalous areas or zones that are indicated as detected anomalies. In 316, it is determined whether to get user feedback. In response to determining not to get feedback, the process ends. In response to determining to get feedback, in 318, detected anomalies are provided for user feedback. For example, a user is provided the detected anomalies and feedback is solicited from the user as to whether the anomaly is valid or whether there are other anomalies. In some embodiments, in the case where a prediction output is beyond a threshold from the forecast, then the prediction output is flagged as a detected anomaly. In 320, user feedback is received on detected anomalies and undetected anomalies. For example, user feedback is received via a user interface. In some embodiments, the user feedback comprises a false detected anomaly indication indicating that a detected anomaly of the detected anomalies is not an anomaly (e.g., a false positive). In some embodiments, the user feedback comprises an undetected anomaly indication indicating that an undetected anomaly of the undetected anomalies is an anomaly (e.g., a false negative anomaly). In 322, the prediction model is retrained using hyperparameters and based on user feedback, and control passes to 312. For example, the prediction model is retrained using the best set of hyperparameters and the user feedback of whether detected anomalies are valid and whether there are any undetected anomalies.

Figure 4:
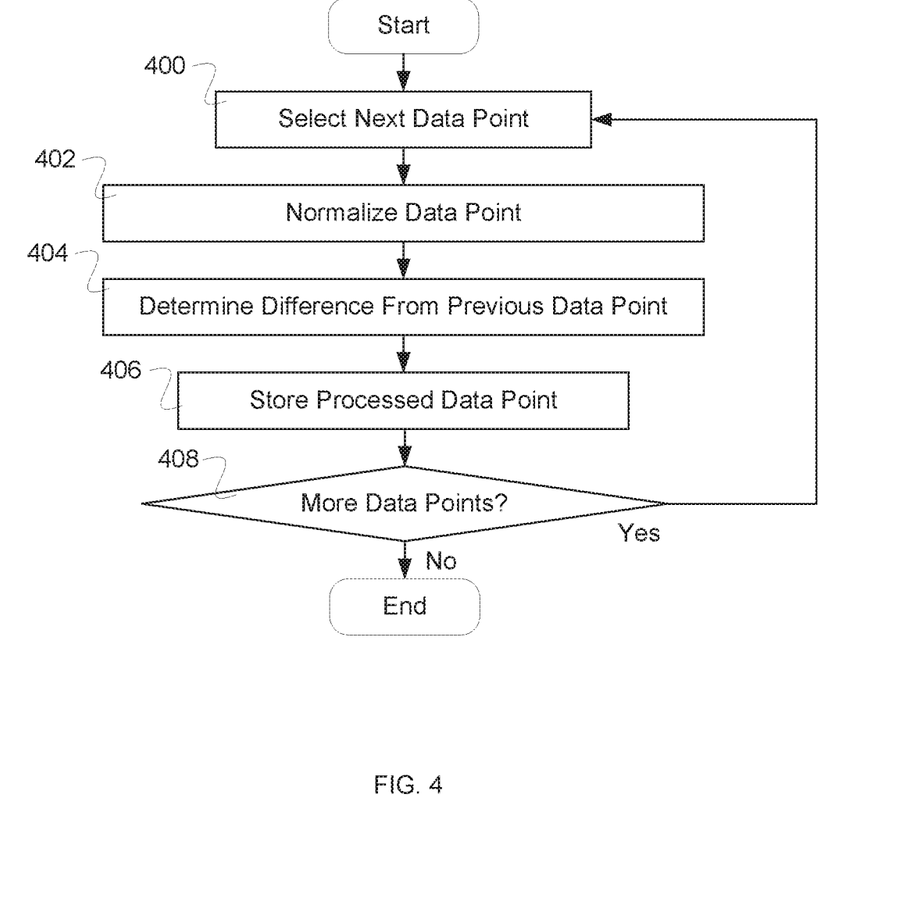
FIG. 4 is a flow diagram illustrating an embodiment of a process for preprocessing data.

FIG. 4 is a flow diagram illustrating an embodiment of a process for preprocessing data. In some embodiments, the process of FIG. 4 is used to implement 302 of FIG. 3. In 400, a next data point is selected. For example, a first or next data point of a data set (e.g., a historical data set) is selected for processing. In 402, the data point is normalized. For example, the data value range of the data point is adjusted to be between normalized limits (e.g., the data value range is adjusted to be between −1 to 1). In 404, a difference from a previous data point is determined. In some embodiments, the differencing mentioned here comprises a data transformation for making the time series stationary. In 406, the processed data point is stored. For example, the preprocessed data point value is stored in an application memory or storage. In 408, it is determined whether there are more data points. For example, it is determined whether there are more data points in the historical data set to be processed for training the model or for testing the model. In response to determining that there are more data points, control passes to 400. In response to determining that there are not more data points, the process ends.

Figure 5:
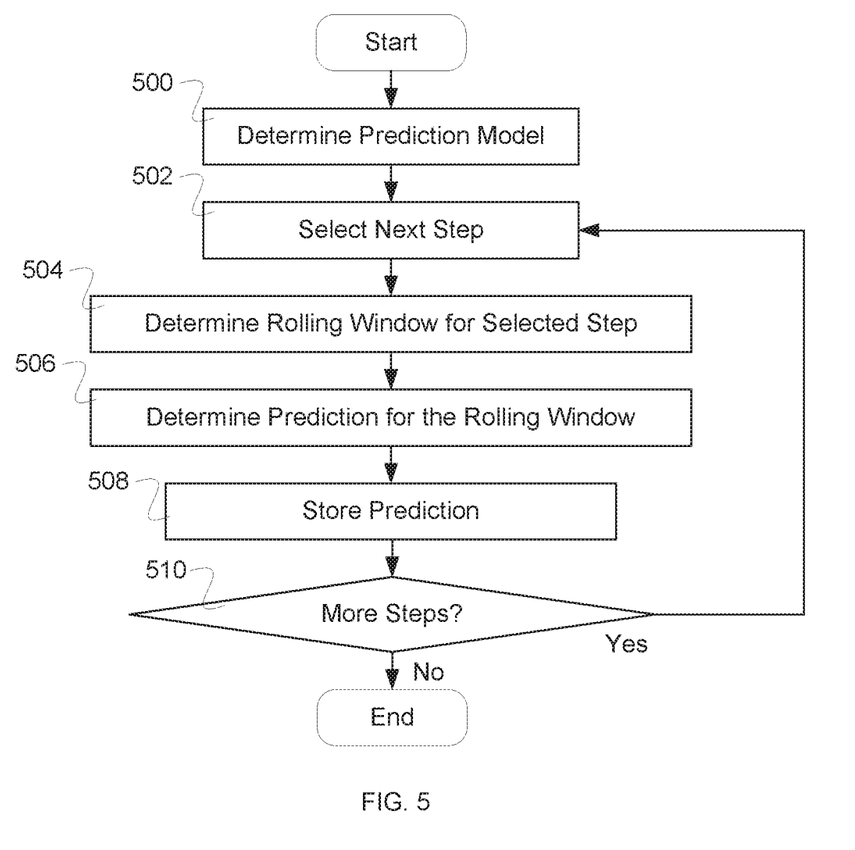
FIG. 5 is a flow diagram illustrating an embodiment of a process for a prediction model.

FIG. 5 is a flow diagram illustrating an embodiment of a process for a prediction model. In some embodiments, the process of FIG. 5 is used to implement 310 of FIG. 3. In the example shown, in 500, the prediction model is determined. For example, the prediction model is generated by training the model using the best hyperparameter set and using the full set of historical data. In 502, a next step is selected. For example, a first or next step is selected to determine a prediction model output. In 504, a rolling window is determined for the selected next step. For example, a fixed window in the past of the predicted value is determined (e.g., N past months are used to generate the next month predicted value-such as 12 months are used to generate a next month value). In 506, the prediction is determined for the rolling window. For example, a fixed data window is used to generate an output of the prediction. In 508, the prediction is stored. For example, the output value of the prediction model is stored in application memory or storage. In 510, it is determined whether there are more steps. For example, it is determined if there are more steps to predict using the model for a desired output. In response to there being more steps, control passes to 502. In response to there not being more steps, the process ends.

Figure 6:
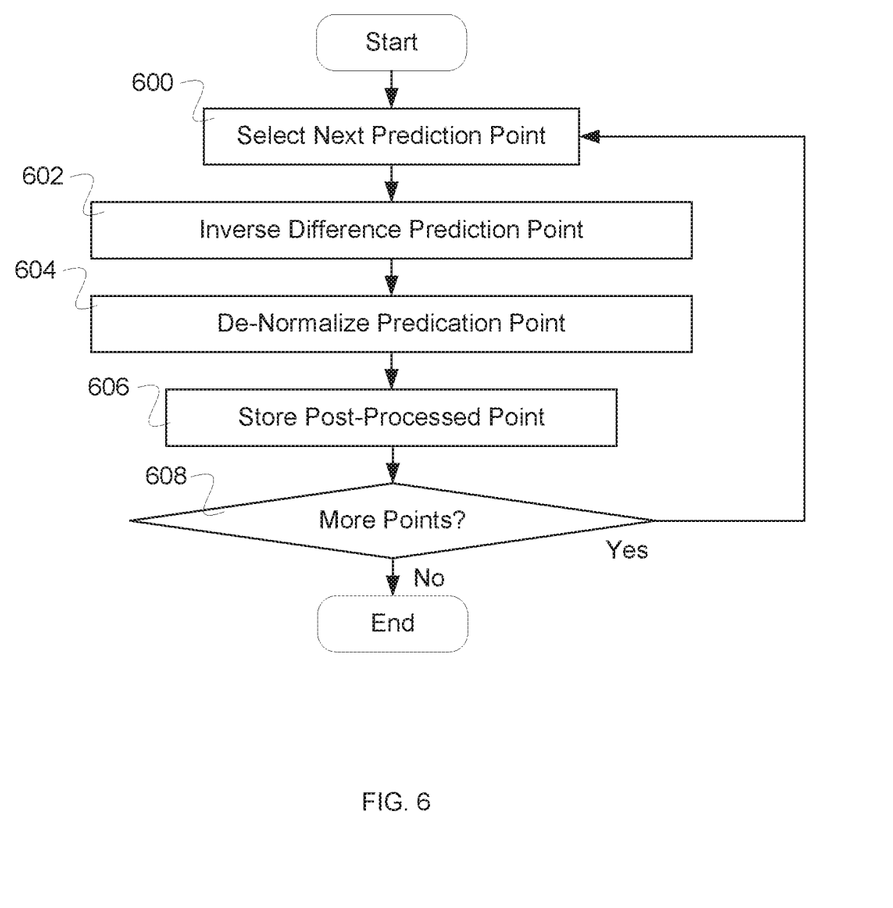
FIG. 6 is a flow diagram illustrating an embodiment of a process for post-processing data.

FIG. 6 is a flow diagram illustrating an embodiment of a process for post-processing data. In some embodiments, the process of FIG. 6 is used to implement 312 of FIG. 3. In the example shown, in 600, a next prediction point is selected. For example, a first or next prediction model output point is selected. In 602, the prediction point is inverse differenced. In some embodiments, the inverse difference comprises an inverse data transformation to make the time series predictions non-stationary so they are similar to the historical input time series. In 604, the prediction point is de-normalized. For example, the normalization is reversed by scaling the output value back to its original range (e.g., using a stored original normalization factor). In 606, the post-processed point is stored. For example, the post-processed output point of the model is stored in application memory or storage. In 608, it is determined whether there are more points. For example, it is determined whether there are more prediction model output points to process. In response to there being more points, control passes to 600. In response to there not being more points, the process ends.

Figure 7:
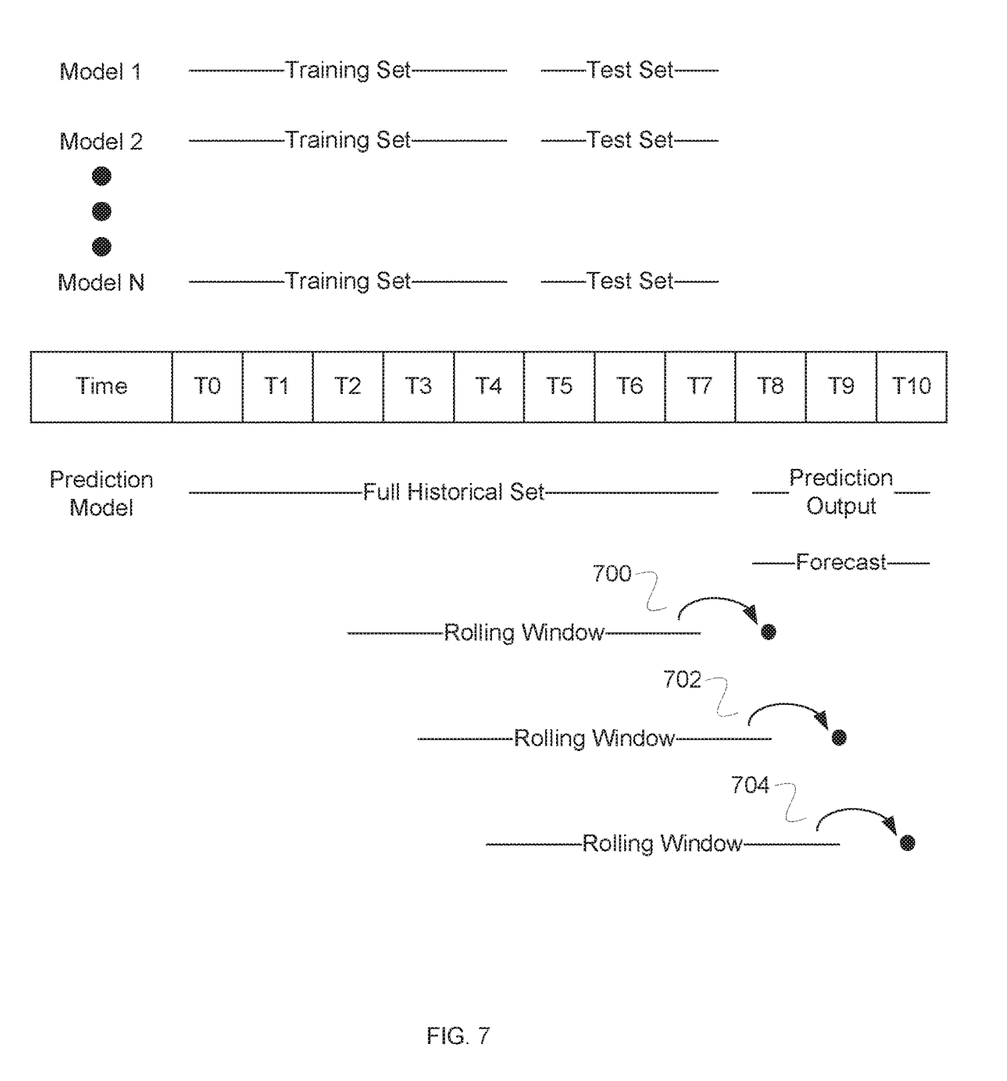
FIG. 7 is a diagram illustrating an embodiment of a data set model.

FIG. 7 is a diagram illustrating an embodiment of a data set model. In some embodiments, the data set model is used to determine a training set and test set of the historical data in 304 of FIG. 3. In the example shown, a historical data set includes data in time periods T0, T1, T2, T3, T4, T5, T6, and T7. The training set is designated as a first set or early set of time periods of the full historical data (e.g., N periods—in this case T0, T1, T2, T3, and T4). The test set is designated as a second set of time periods or a more recent set of time periods of the full historical data (e.g., M periods—in this case T5, T6, and T7). During training, model 1, model 2, and up to model N are trained using the data in the training set and then tested using the data in the test set. The training and testing of the plurality of models are used to determine a tuned optimal set of hyperparameters by selecting the set of hyperparameters associated with the best test results of its model. The set of hyperparameters is then used to determine the final prediction model on the full historical set of data. The model is run to determine a prediction model output. The prediction output can be generated using a prediction model and a rolling window. In the example shown, rolling window 700 of L months (e.g., 6 months T2, T3, T4, T5, T6, T7) is used to predict output value at T8; rolling window 702 of L months (e.g., 6 months T3, T4, T5, T6, T7, T8) is used to predict output value at T9; and rolling window 704 of L months (e.g., 6 months T4, T5, T6, T7, T8, T9) is used to predict output value at T10.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a prediction model, comprising:
   an interface configured to:
      receive historical data; and
   a processor configured to:
      determine a training data set and a test data set from the historical data;
      train a plurality of models using the training data set to obtain a plurality of trained models;
      determine a best trained model of the plurality of trained models using the test data set;
      select hyperparameters associated with the best trained model;
      generate a prediction model using the hyperparameters and the historical data to obtain a trained prediction model;
      receive a forecast;
      determine an output of the trained prediction model corresponding to the forecast;
      determine at least one detected anomaly based on a difference between the forecast and the output of the trained prediction model exceeding a threshold;
      provide the forecast, the output of the trained model, and the at least one detected anomaly to a user using a user feedback interface;
      receive user feedback from the user using the user feedback interface, wherein the user feedback comprises:
         a false detected anomaly indication indicating that the at least one anomaly is not an anomaly; and
         an undetected anomaly indication indicating that an undetected anomaly is an anomaly; and
      retrain the trained prediction model using the hyperparameters and the user feedback to obtain a retrained prediction model.

2. The system of claim 1, wherein the historical data is preprocessed.

3. The system of claim 2, wherein preprocessing comprises normalizing the historical data.

4. The system of claim 2, wherein preprocessing comprises differencing the historical data.

5. The system of claim 1, wherein the training data set comprises a first portion of the historical data from an earliest time period of the historical data.

6. The system of claim 1, wherein the training data set comprises a first portion of the historical data from a first time period and the testing data set comprises a second portion of the historical data from a second time period, wherein the second time period is a more recent time period than the first time period.

7. The system of claim 1, wherein the output of the trained prediction model is postprocessed.

8. The system of claim 7, wherein post-processing comprises inverse differencing the output of the trained prediction model.

9. The system of claim 7, wherein post-processing comprises de-normalizing the output of the trained prediction model.

10. The system of claim 1, wherein the forecast is received using the interface.

11. The system of claim 1, wherein the processor is further configured to determine to get the user feedback.

12. A method for a prediction model, comprising:
receiving historical data using a user interface;
determining, using a processor, a training data set and a test data set from the historical data;
training a plurality of models using the training data set to obtain a plurality of trained models;
determine a best trained model of the plurality of trained models using the test data set;
selecting hyperparameters associated with the best trained model;
generating a prediction model using the hyperparameters and the historical data to obtain a trained prediction model;
receiving a forecast;
determining an output of the trained prediction model corresponding to the forecast;
determining at least one detected anomaly based on a difference between the forecast and the output of the trained prediction model exceeding a threshold;
providing the forecast, the output of the trained model, and the at least one detected anomaly to a user using a user feedback interface;
receiving user feedback from the user using the user feedback interface, wherein the user feedback comprises:
a false detected anomaly indication indicating that the at least one anomaly is not an anomaly; and
an undetected anomaly indication indicating that an undetected anomaly is an anomaly; and
retraining the trained prediction model using the hyperparameters and the user feedback to obtain a retrained prediction model.

13. A computer program product for a prediction model, the computer program product being embodied in a non-transitory computer readable storage medium and comprising computer instructions for:
receiving historical data using a user interface;
determining, using a processor, a training data set and a test data set from the historical data;
training a plurality of models using the training data set to obtain a plurality of trained models;
determine a best trained model of the plurality of trained models using the test data set;
selecting hyperparameters associated with the best trained model;
generating a prediction model using the hyperparameters and the historical data to obtain a trained prediction model;
receiving a forecast;
determining an output of the trained prediction model corresponding to the forecast;
determining at least one detected anomaly based on a difference between the forecast and the output of the trained prediction model exceeding a threshold;
providing the forecast, the output of the trained model, and the at least one detected anomaly to a user using a user feedback interface;
receiving user feedback from the user using the user feedback interface, wherein the user feedback comprises:
a false detected anomaly indication indicating that the at least one anomaly is not an anomaly; and
an undetected anomaly indication indicating that an undetected anomaly is an anomaly; and
retraining the trained prediction model using the hyperparameters and the user feedback to obtain a retrained prediction model.

* * * * *